Jan. 11, 1955   R. V. ADAIR ET AL   2,699,412
PINION QUENCHING MACHINE AND PROCESS
Filed Oct. 22, 1949   9 Sheets-Sheet 1

FIG. 1

INVENTOR.
ROBERT VOIGT ADAIR
DWIGHT VANDEVATE
BY
*Attorney*

FIG. 2

INVENTOR.
ROBERT VOIGT ADAIR
DWIGHT VANDEVATE

FIG. 17

INVENTOR.
ROBERT VOIGT ADAIR
DWIGHT VANDEVATE

Jan. 11, 1955   R. V. ADAIR ET AL   2,699,412
PINION QUENCHING MACHINE AND PROCESS
Filed Oct. 22, 1949   9 Sheets-Sheet 9

FIG. 18

INVENTOR.
ROBERT VOIGT ADAIR
DWIGHT VANDEVATE
BY
Attorney

United States Patent Office 2,699,412
Patented Jan. 11, 1955

2,699,412

PINION QUENCHING MACHINE AND PROCESS

Robert V. Adair, Rochester, and Dwight Vandevate, Brighton, N. Y., assignors to Gleason Works, Rochester, N. Y., a corporation of New York Application October 22, 1949, Serial No. 123,052

23 Claims. (Cl. 148—12.4)

The present invention relates to a quenching method and machine and particularly to a method and machine for quenching shank pinions, and especially spiral bevel and hypoid shank pinions.

In quenching a spiral bevel or hypoid ring gear, it is the practice to place the hot work piece in a quenching press and to clamp it between upper and lower dies while expanding segments into its bore. Thus, the gear is held against warpage and prevented from going out of round when the quenching liquid strikes it. With a shank pinion, however, it is impractical to make upper and lower dies to hold the hot pinion during quenching, and, of course, such a pinion has no bore by which it may be centered.

Such attempts as have been made in the past to provide apparatus for holding shank pinions against distortion during hardening have not been completely satisfactory. In most cases the pinion shank gets out of shape during quenching and has to be straightened again as well as possible on a straightening press.

One object of the present invention is to provide a method and a machine for quenching shank pinions with which such a pinion may be hardened without being warped or distorted.

Another object of the invention is to provide a machine for quenching shank pinions which is fully automatic in operation from the time that the pinion, which is to be hardened, is placed in the machine until the quenching operation is completed.

Other objects of the invention will be apparent hereinafter from the specification and from the recital of the appended claims.

The machine illustrated in the drawings is a three-unit machine, that is, it will handle and harden simultaneously three pinions. Each unit is identical to the others; and each unit operates independently of the others. In the following description, only one unit will be described in detail. It will be understood that the others are of identical construction and operate in identical fashion.

Each unit comprises a chamber at one side of which a transfer arm is pivotally mounted and at the other side of which a door is hingedly mounted. The transfer member is movable from loading position to working position and includes a fixed jaw and a movable jaw. At loading position the movable jaw is held in its open, non-gripping position by a stationary cam.

The pinion, which is to be hardened, is placed immediately after its removal from the heating furnace, in the transfer member. As soon as the unit is started, the transfer member swings away from loading position; and as it so swings the movable jaw of the transfer member is moved under actuation of a spring to grip the work firmly.

When the transfer member reaches working position, the pinion is axially aligned with an upper center and a lower center; a blast of air is blown into the recesses at the two ends of the work piece, which are to receive these centers to blow out any dirt; and then the upper center is lowered to cause the work to be gripped securely between the two centers. The transfer arm is then swung back toward loading position, releasing the work so that it is now held between the two centers. The centers then start rotating; and the door closes on the quenching chamber.

Mounted in each unit is a slide that carries two pairs of rollers that are intended to press against the shank of the work at angularly and axially spaced points. As the door is closing, these rollers are forced by a hydraulically-actuated toggle member into engagement with the work. The hot work piece is then spun in engagement with these rollers for a sufficint time for the shank of the pinion to be straightened through the application of the pressure of the rollers at axially spaced points to its shank as it rotates. The work piece is in a more or less plastic state and the pressure of the rollers on its shank as it spins straightens the shank.

When the door has firmly closed on the chamber, the oil or other quenching liquid is turned on, flooding the chamber so that the pinion is quenched as it continues to spin with the rollers pressing on its shank. The cam, which controls the sequence of operations, may be stopped at this stage long enough for the pinion to be quenched properly and cooled sufficiently for handling.

After the quenching operation is completed, the oil or other quenching liquid is drained from the quenching chamber; and the pressure on the rollers is relieved. Then the door to the quenching chamber is swung open; and the transfer member is swung into the quenching chamber to grasp the work. The upper center is then moved away to release the work; and the transfer member swings the now-hardened, straightened, and coiled work piece out to loading position where the movable jaw is released, permitting removal of the hardened work piece from the transfer member and loading therein of a new hot pinion.

The structure and operation of the machine will now be described in detail, reference being had to the drawings where the same numerals designate, respectively, the same parts in all the figures.

The machine comprises a base 20 and an upright 21. These may be integral with one another or be secured together in any suitable fashion. As illustrated, the machine base and upright are fabricated of sheet metal with suitable bracings and reinforcements welded together.

Figure 2:
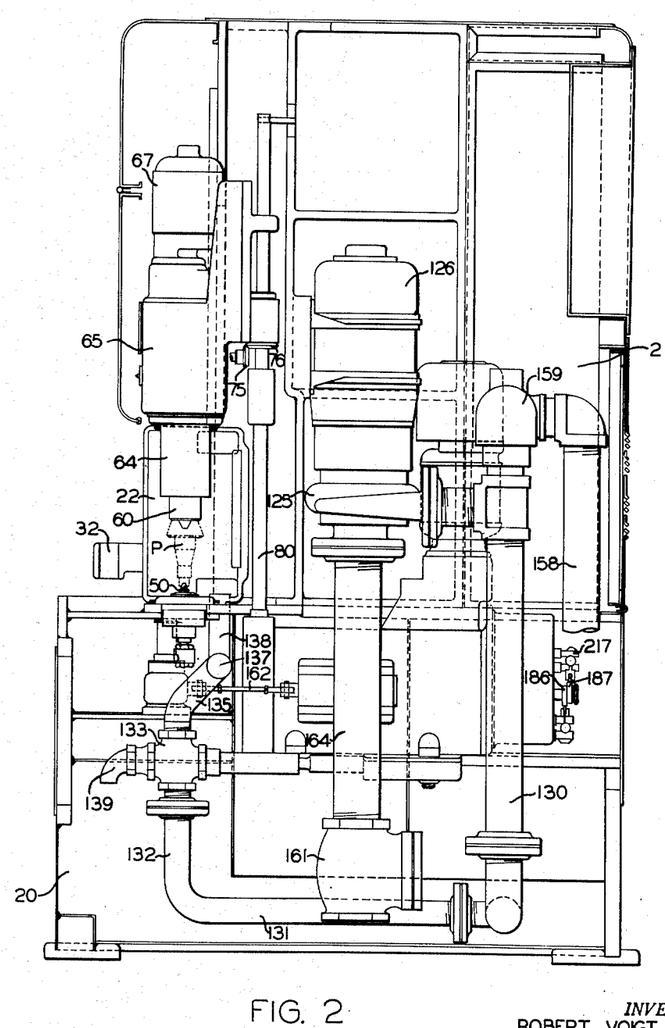
Fig. 2 is an elevational view looking at the machine from the right hand side of Fig. 1 with the side cover plate of the machine removed.
Figure 3:
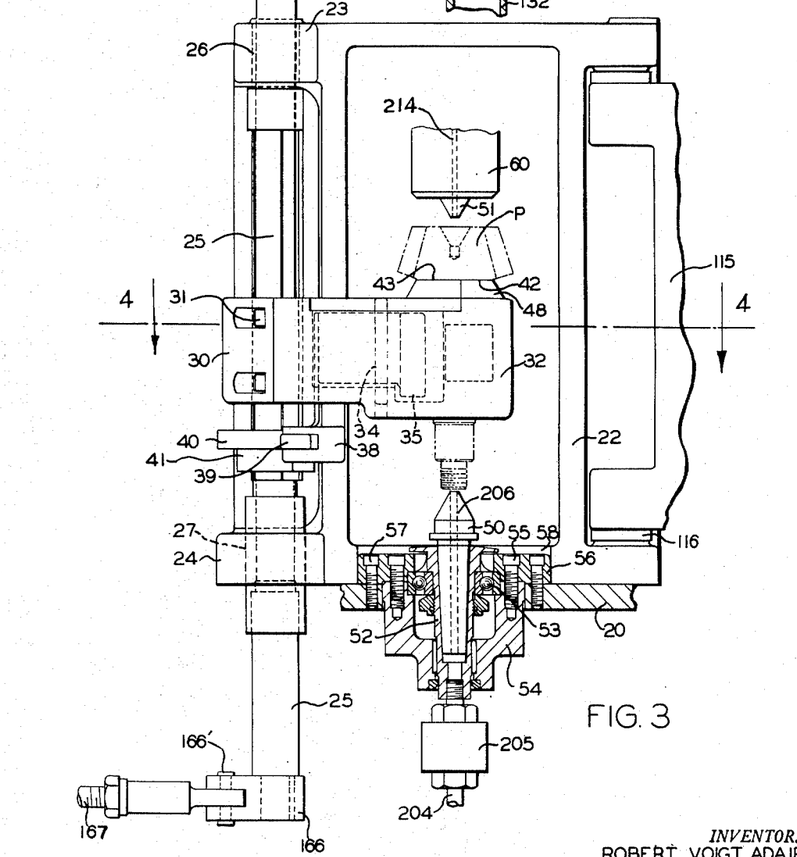
Fig. 3 is a fragmentary view on a greatly enlarged scale showing one of the loader or transfer members of the machine, the quenching chamber with which the loader is associated, and the upper and lower centers which support the work during hardening, the upper center being shown fragmentarily, the transfer member being shown at the end of its inward swinging movement, to operative position, the work-piece carried thereby being shown in dotted lines, and the centers being shown in withdrawn position.
Figures 4, 7:
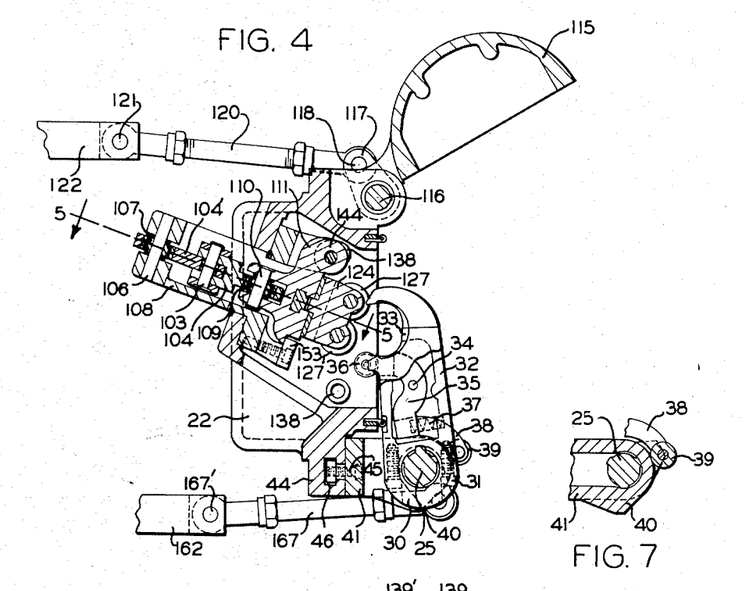
Fig. 4 is a fragmentary view at right angles to Fig. 3, and with certain parts appearing in section in approximately the plane indicated by lines 4—4 in Figs. 3 and 5 illustrating in addition to the parts shown in that figure, the door which is associated with the unit illustrated and which is adapted to enclose the work in the well of the unit during hardening, one toggle member, the set of rollers associated therewith for holding the shank of the work straight during hardening, and the linkages for operating the transfer member and the door.
Fig. 7 is a fragmentary sectional view showing the cam for moving the gripping arm of one of the loader members to released position.

At the front of the upright 21 are provided three separate quenching chambers 22 (Figs. 2 and 3), one forming part of each hardening unit. Each of these chambers has a pair of axially aligned bearings 23 and 24 (Fig. 3) formed integral with its wall at one side. A shaft 25 is journaled in these bearings on bushings 26 and 27. Keyed to this shaft 25 to be axially adjustable therealong is a transfer arm or loader 32 (Figs. 3 and 4). This arm is adapted to be secured in any adjusted position on the shaft by a cap member 30 and bolts 31.

Each loader arm 32 is formed at its free end with a fixed jaw 33. Pivotally mounted upon a pin 34 in each arm 32 is an arm 35 on one end of which is rotatably mounted a roller 36. The arm 35 and roller 36 constitute a movable jaw and are adapted to cooperate with the fixed jaw 33 to securely hold the work in the transfer arm 32 during transfer of the work to or from operating position. The arm 35 is constantly biased to urge the roller 36 into work-gripping position by a coil spring 37 which is interposed between the arm 35 and the arm 32.

Rigidly connected to the end of the arm 35, opposite that which carries the roller 36, is an arm 38 on which is rotatably mounted a roller 39. This roller is adapted to ride upon a cam plate 40 (Figs. 4 and 7). This plate is integral with a bracket 41. The bracket 41 is mounted to be vertically adjustable along a pad 44 that is formed integral with chamber 22 at one side thereof. Bracket 41 is adapted to be secured in any adjusted position along the pad by a T-bolt 45 whose head engages in a T-slot 46 formed in the face of the pad. This adjustment permits the cam 41 to be adjusted to suit the adjustment of transfer member 30 on shaft 25 to maintain operative relation therewith. When the roller 39 rides on the cam 40, the arm 35 is moved against the pressure of the spring 37 to move the roller 36 away from the jaw 33 to work-releasing position.

A typical work piece such as may be hardened on this machine is shown at P in the drawings. In the transfer operation, the shank of pinion P is held in the transfer arm 32, gripped between roller 36 and jaw 33 with its back face 42 (Fig. 3) resting on the upper surface 43 of boss 48 of transfer arm 32.

During hardening each work piece is held between a lower center denoted at 50 and an upper center 51. Center 50 has a pressed fit in a sleeve 52 which is journaled on an antifriction bearing 53 in a member 54 that is secured by screws 55 to a cap or collar 56 which, in turn, is secured by screws 57 to the upper face of the base 20 of the machine. The cap or collar 56 fits into a cylindrical opening 58 in the bottom wall of the chamber 22; and the cap 56 with the center 50 and member 52 close this lower opening 58 in the bottom wall of the chamber.

The upper center 51 (Figs. 3 and 8), which is axially aligned with lower center 50, is mounted to slide in a sleeve 60 which is journaled on antifriction bearings 61 and 62 in a support or arbor 64. This support is secured in a bracket 65. Sleeve 60 serves to rotate pinion P during the hardening operation. There is a nose-piece 59 seated aagainst the bottom face of the sleeve. This nose-piece is formed on its lower face with gripping teats 63 which are adapted to drivingly engage the hot pinion. The nose-piece is clamped to the sleeve by a nut 66 that threads onto the sleeve. The center 51 is held to rotate with the sleeve 60 by the screw 71 which threads into the arbor 60 and engages in the slot 74 that is formed in center 51.

The sleeve 60 is adapted to be drive from motor 67. This motor drives shaft 69 through a conventional gear reduction which is housed in the housing 68. The shaft 69 is coupled to the sleeve 60 by a conventional coupling 70. A coil spring 72, which is housed within the sleeve 60 and interposed between the center 51 and a plate 73 in the upper end of the sleeve, serves to press the center downwardly at all tims into engagement with the work.

The vertical positions of the center 51 and sleeve 60 may be adjusted manually by rotation of a bevel gear 75 (Fig. 2) which is adapted to mesh with a bevel gear 76 (Figs. 2 and 8) that is journaled in the bracket 65. Bevel gear 76 has an integral sleeve portion 77 that is internally threaded to engage with the screw-threaded portion 78 of a shaft 80. The bevel gear 76 is held against axial movement relative to bracket 65 by a nut 82 which threads onto the sleeve 77 of the gear. This nut 82 is adapted to seat against a washer 83, which is mounted in a recess of the upper face of the projection 81 of bracket 65, and is adapted to pull the back face of the gear 76 against a washer 84 which is seated in a recess formed in the lower face of this projection 81.

The shaft 80 is flexibly connected at its lower end with a socket member 85. A screw 86, that carries a washer 87, threads into the lower end of the shaft 80; and a spring 88 is interposed between this washer and a washer 89. The latter washer seats against a nut 90 that threads into the member 85. The member 85 has a threaded connection with a rod 92. The rod 92 is mounted to reciprocate in plain bearings 97 (Fig. 9) provided in the end member 98 of cam housing 170. The rod 92 carries a pin or stud 93 on which is journaled a roller 94 which engages in the cam track 95 of a rotary face cam 96. As this cam rotates, therefore, the rod 92 and shaft 80 are reciprocated, and the bracket 65 carrying the motor 67, and the upper center 51 are moved toward or away from the work to engage the center with the work, or to disengage it therefrom, at the proper times in the cycle of operation of the machine as will be described more fully hereinafter.

As the hot pinion, which is to be hardened, rotates during the hardening operation, pressure is continuously applied to the shank of the pinion at axially spaced points to prevent the shank from bowing and to straighten it out. For this purpose there is provided back of each chamber 22 a reciprocating cylinder 100 (Fig. 5) and a piston 101 which reciprocates therein.

Piston 101 is connected to a piston rod 102 which is bifurcated at its upper end and pivotally connected by pin 103 to two arms 104 and 104' that constitute a toggle member 105. Arm 104' is pivotally mounted by means of pin 106 and spherical bearing 107 (Fig. 4) in a housing 108 that encloses cylinder 100 and that is supported from the back wall of chamber 22. Arm 104 is pivotally mounted by means of spherical bearing 109 and pin 110 in a carrier 111 which is reciprocable in housing 108.

Lower end plate 112 of cylinder 100 is pivotally connected by pin 113 to two arms 114 and 114'. These arms are pivotally mounted by means of pins 119 and 119', respectively, on carrier 111 and housing 108, respectively, and constitute a lower toggle member 105'.

Mounted for vertical adjustment on the front face of each carrier 111 are two brackets 124, 124'. Journaled in bracket 124 for rotation about parallel axes are two cylindrical rollers 127; and journaled in bracket 124' for rotation about parallel axes are two other cylindrical rollers 127'. The rollers 127 are adapted to engage at spaced points around the periphery of one bearing portion 128 of the shank 129 of the pinion P while the rollers 127' are adapted to engage at spaced points around the pheriphery of another bearing portion 128' of the pinion shank. Through adjustment of brackets 124 and 124' on carrier 111 the rollers 127 and 127' can be adjusted to be opposite those bearing portions of the pinion shank with which it is desired that they be engaged. The brackets are adapted to be secured in adjusted positions by gib members 139 and bolts 139'. The gib members engage in the T-slot 123 formed in the front face of carrier 111.

The carrier 111 is pivoted on a pintle 144 (Figs. 4 and 6) which is journaled in lugs 144' of housing 108; and the toggle members 105 and 105', as they are extended, tend to press the carrier 111 against stops 153 which limit forward movement of rollers 127 and 127'. When the carrier 111 is against the stops 153, the rollers occupy positions corresponding to the cold (normal) temperature size of the bearing portions 128, 128' of the shank of the pinion with which the rollers are engaged. As the pinion shank is spun against the rollers, 127 and 127', then, as will be described further hereinafter, the cylinder 100 and piston 101, acting through toggle members 105 and 105' tend to press the pinion shank to its desired cold position, thereby insuring that at the end of the hardening operation, the pinion shank will be straight and will occupy its desired position.

For effecting the hardening operation, as already indicated, the hot pinion is rotated in a bath of oil. The oil is contained within a well formed by the walls of chamber 22 including a door 115 (Figs. 4 and 1), when the door is closed. This door is mounted by means of upper and lower hinge pins 116 on one side wall of the chamber 22. To one of these pins is keyed an arm 117 which is pivotally connected by means of pin 118 with a rod 120 that is pivotally connected at 121 with an arm 122. This arm, as will hereinafter be described, is actuated by a cam to swing the door to or from closed position.

When the pinion has been mounted between the centers 50 and 51 (Fig. 3) and the door 115 has been closed, the hot pinion is rotated for a brief period in engagement with rollers 127 and 127', as has already been described, before the quenching liquid is turned on. This liquid is pumped from a sump at the base of the machine by a pump denoted generally at 125 (Fig. 2) which is driven by a motor 126 that is mounted in the upright 21. From the pump, the quenching liquid is pumped, through a pipe 130 and the piping 131 into upright pipes 132 of which there is one for each hardening unit. Each of the pipes 132 delivers the quenching liquid to a valve head 133 (Figs. 2, 13 and 16), the pipe 132 communicating with the passage 134 in the valve head. From the valve head the quenching liquid is adapted to be delivered through passage 136, a pipe 135, that communicates with this passage, a horizontal pipe 137, two vertical pipes 138 (Fig. 4), which connect with pipe 137, into the quenching chamber 22 at opposite sides of the center 50 (Fig. 4).

Figures 9, 10, 11, 12:
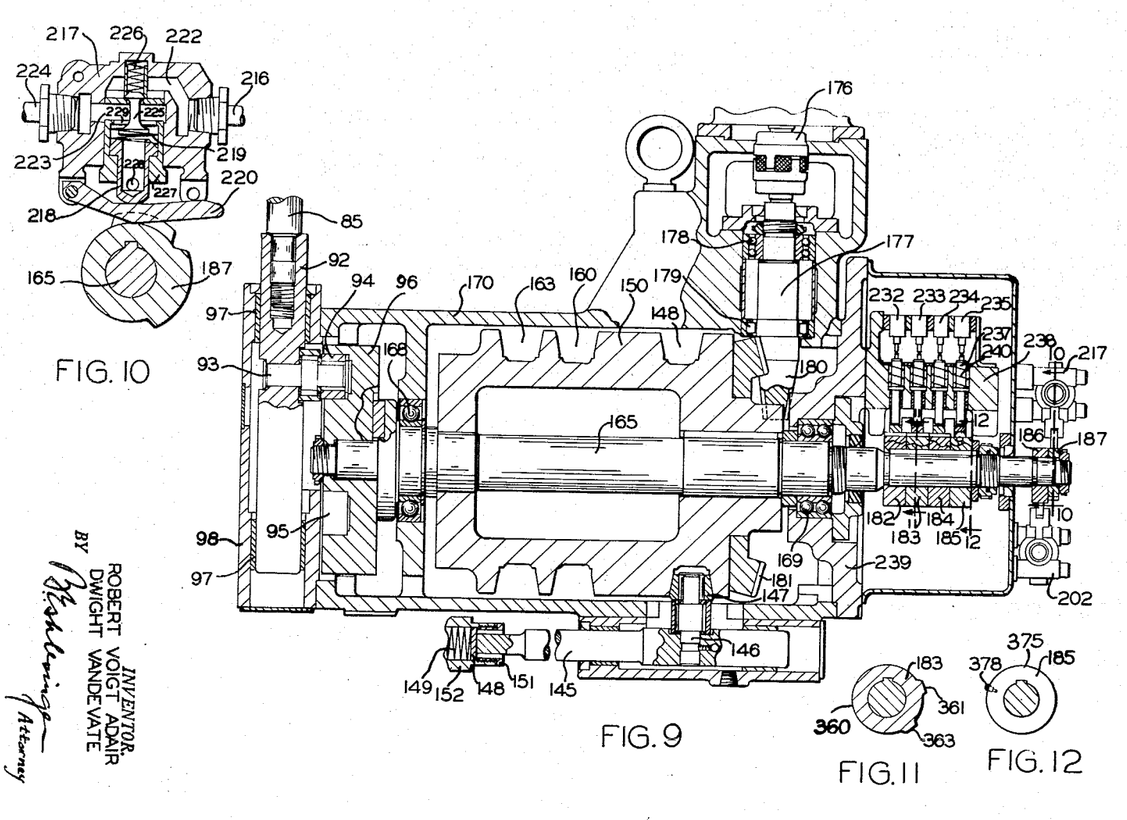
Fig. 9 is a fragmentary sectional view on the line 9—9 of Fig. 1 showing the cams which control the operations of one unit of the machine, the means for driving these cams, and parts associated therewith.
Fig. 10 is a section on the line 10—10 of Fig. 9 on a greatly enlarged scale.
Fig. 11 is a detail sectional view on line 11—11 of Fig. 9 showing the cam which controls quenching in one of the units of the machine.
Fig. 12 is a section on the line 12—12 of Fig. 9 showing in end view the several control cams for the electrically operated parts of the unit.
Figure 13:
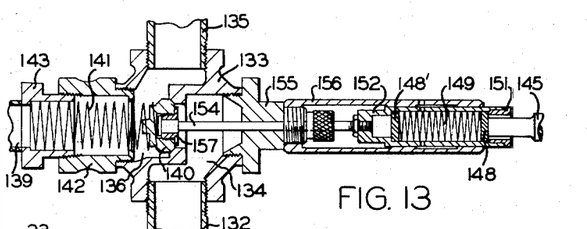
Fig. 13 is a fragmentary sectional view showing the valve which controls flow of the quenching fluid to the work piece being hardened in one unit.

The valve 140 controls the connection between passages 134 and 136. This valve is normally held in closed position by a coil spring 141 (Fig. 13) which is housed in the sleeve 142 that is threaded into the valve casing. A nut 143, that threads into sleeve 142, controls the tension of the spring. The valve is adapted to be opened at the required periods in the operation of the machine by movement of the rod 145 (Fig. 9). This rod carries a stud 146 on which is rotatably mounted a tapered roller 147 that engages in the cam track 148 of cam 150. The rod 145 has a telescoping, sliding fit with a bushing 151 and is secured at its free end in a disc 148. A coil spring 149 is interposed between the disc 148 (Fig. 13) and a disc 148'. The spring 149 is housed in a sleeve 152 which threads onto bushing 151. The stem 154 of the valve 140 has a threaded connection with this sleeve, as shown in Fig. 13. The stem is guided in its movement by a nipple 155 which threads into the valve casing 133. The sleeve 152 is guided in its movement by a sleeve 156 which threads onto nipple 155. The valve stem 154 is secured to the valve 140 by a nut 157 which threads into the valve and engages the head of the stem.

159 (Fig. 2) denotes the relief valve of the system, and 158 denotes the pipe which connects the relief valve with the sump. The quenching liquid is sucked up from the sump through a strainer head 161 and line 164.

Figure 16:
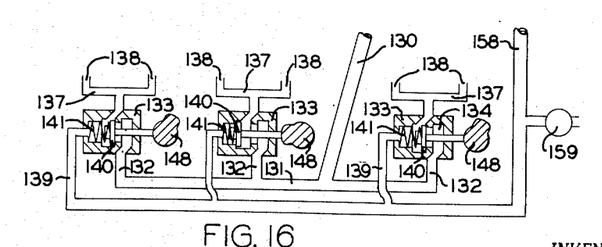
Fig. 16 is a diagram of the hydraulic circuit of the machine.

In the position of the valves 140 shown in Fig. 13 and in the left hand and right hand units of Fig. 16, the duct 138 is on exhaust and the quenching liquid drains out of the chamber 22. The quenching liquid flows out of pipes 138, pipe 137 and valve passage 136 into a pipe 139 that leads back to the sump provided in the base of the machine.

When cam 150 (Fig. 9) rotates far enough for cam track 148 to move the rod 145 associated therewith to the left from the position shown in Figs. 9 to 13, the corresponding valve 140 is opened to connect passage 134 with passage 136. When a valve 140 is thus opened, the associated pipe 132 is connected with pipe 135 so that the quenching liquid is supplied to the associated chamber 22.

The rod 122 (Fig. 4) which operates the door 115 carries a roller (not shown), similar to roller 147 (Fig. 9), that engages in the cam slot 160 of cam 150 so that this rod is moved at the required periods in the operation of the machine to open or close the door 115. Similarly the arm 166 (Fig. 3), which is secured to the shaft 25 at the lower end thereof, is connected by a pin 166' to a rod 167. This rod is pivotally connected by a pin 167' (Fig. 4) to a rod or bar 162 which carries a stud and roller similar to the stud 146 and roller 147 (Fig. 9), and that engages in the slot 163 of cam 150. Thus, as each cam 150 is rotated, the associated transfer arm 32 is swung in one direction or the other, the associated door 115 is swung in one direction or the other, and the associated valve 140 is opened or closed, all at the proper time in the cycle.

The barrel cam 150 is keyed to a shaft 165 (Fig. 9) that is journaled on anti-friction bearings 168 and 169 in a bracket 170 that is secured in the base of the machine. The face cam 96, which controls the movements of the upper center 51, is also keyed to this shaft. This shaft is driven during operation of the machine from a motor 175, indicated diagrammatically in Fig. 17. This motor is connected by a suitable coupling 176 (Fig. 9) with shaft 177 that is journaled on anti-friction bearings 178 and 179 in bracket 170. This shaft carries a hypoid pinion 180 which meshes with a hypoid gear 181 that is fastened to cam 150.

Keyed to the shaft 165 are also four cams 182, 183, 184 and 185, which operate the electrical controls of the machine, and two cams 186 and 187, which control the pneumatically-actuated parts of the machine. The operation of cams 186 and 187 and of the parts associated therewith will first be described.

As has already been stated, compressed air is blown through the lower and upper centers 50 and 51, respectively, just prior to clamping of the work between these centers, in order to clean dirt or chips out of the recesses 129' and 129'' in the ends of the work so that the work piece may be spun truly between the centers. The cylinders 100 and pistons 101 (Figs. 5 and 15), which actuate the toggle members 105 and 105', are also pneumatically operated.

Figures 5, 6:
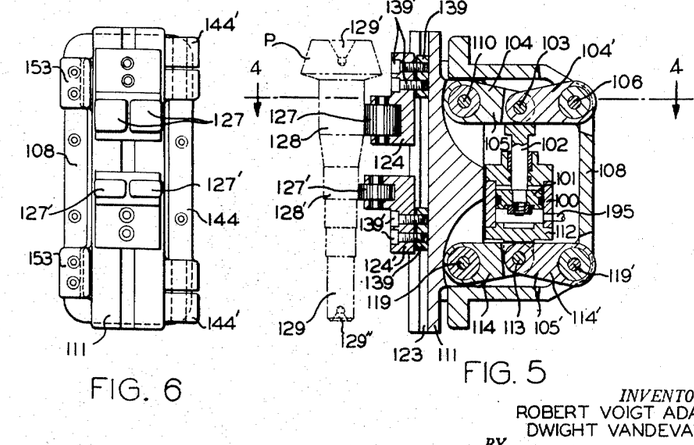
Fig. 5 is a vertical section approximately on the line 5—5 of Fig. 4 showing also in dotted lines a pinion in operative engagement with the straightening rollers.
Fig. 6 is a front elevation of the parts shown in Fig. 5 but with the pinion removed.
Figure 15:
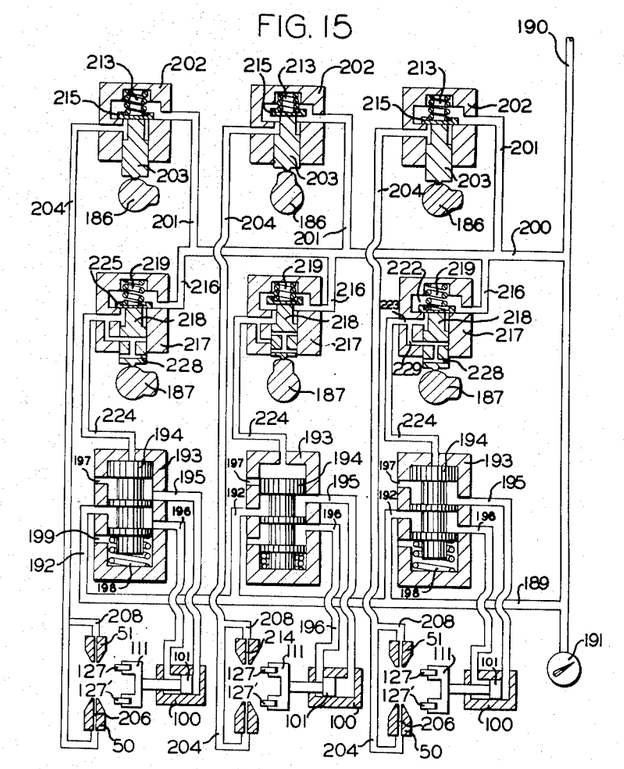
Fig. 15 is a diagram of the pneumatic circuit of the machine.

The compressed air may be supplied from any suitable source, as from a line in the factory in which the machine is used. The compressed air supply duct is denoted at 190 (Fig. 15). Pressure of the air in this duct may be measured by the gauge 191. From the line 190, the compressed air flows from a line 189, through lines 192 into casings 193, one for each unit, each of which houses a valve 194. A coil spring 198 serves to urge each valve 194 continuously in one direction to its casing. Each casing 193 is connected by lines 195 and 196 with one of the cylinders 100 (Figs. 5 and 15). Exhaust ports are provided in each casing 193 at 197 and 199.

Figures 8, 14:
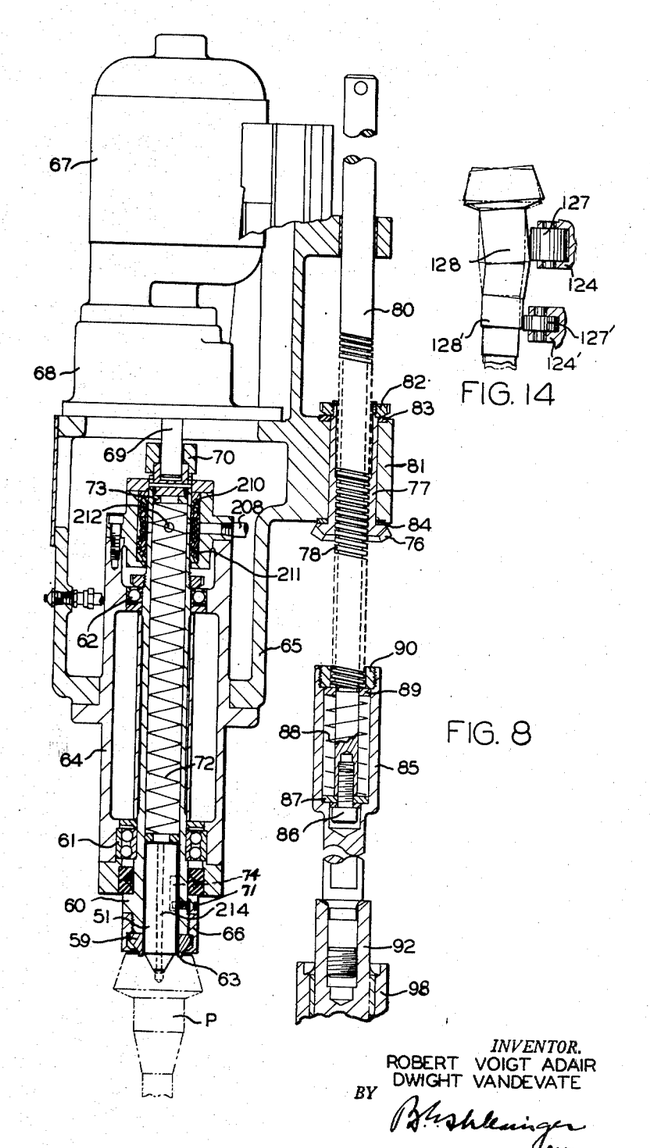
Fig. 8 is an enlarged fragmentary sectional view showing one of the upper centers of the machine, and the means for rotating the same and for advancing it axially to maintain it in operative relation with the work as the work shrinks during hardening.
Fig. 14 is a diagrammatic view illustrating how pressure applied to the shank of the hot work piece at two axially spaced points, serves to straighten out the work piece as it rotates during hardening.

The supply line 190 is also connected through ducts 200 and 201 with valve casings 202 (Figs. 9 to 15) in each of which there is mounted a valve 203. Each valve 203 controls supply of compressed air to a duct 204 (Figs. 3 and 15) that leads to a swivel fitting 205 which is threaded into the rotatable sleeve 52 (Fig. 3). The sleeve 52 has an air duct extending through it through which air may be supplied to the duct 206 extending through the lower center 50. A duct 208 (Fig. 15) also connects each duct 204 with a chamber between two packings 210 and 211 (Fig. 8). From this chamber the compressed air passes through the hole 212 in the sleeve 60 and into the duct 214 which extends through the upper center 51.

Each valve 203 is held in engagement with its associated cam 186 by a coil spring 213 (Fig. 15); and each valve 203 carries a valve disc 215 that is adapted to close off communication between a line 201 and its associated line 204 when the valve rides down off of the lobe of associated cam 186. In Fig. 15, the valves 203 at the left and right are shown closed, while the valve 203 in the center is open.

The valves 203 are shown diagrammatically in Fig. 15 as riding directly on cams 186. However they may be operated through rockable arms as are the valves 218 next to be described.

The duct 200 is connected by ducts 216 with valve casings 217. A valve 218 (Figs. 10 and 15) slides in each of these casings. Each valve 218 is normally spring-pressed outwardly by a coil spring 219 to engage an arm 220 which is pivotally connected at one end to valve-casing 217 and which rides on the associated cam 187. The duct 216 communicates with a passage 222 in the valve casing. There is another passage 223 in the valve casing that communicates with a duct 224 that leads into the upper end of the associated valve casing 193. Connection between the passages 222 and 223 is normally shut off by a double-ended valve 225 that is held with one end seated by a spring 226. Each valve 218 slides in a nipple or guide 227 which is mounted in the associated casing 217. Valve 218 has a hole 228 in it; and nipple 227 has an aperture 229 in it through which the lower end of the double-ended valve 225 extends. The lower end of this valve is adapted to seat in the upper end of valve 218 when the latter valve is held in its upper position by cam 187.

When each valve 218 is in its lowermost position, the passages 223, 229 and 228 are in communication with one another, and air may exhaust from duct 224 into the atmosphere. This permits spring 198 to move the associated valve 194 to its uppermost position. In this position the associated duct 196 is on supply from duct 192, and the associated duct 195 is on exhaust, the air exhausting through air vent 197. In this position, then, toggle members 105 and 105' (Fig. 5) are folded to move carrier 111 (Figs. 4 and 5) to its withdrawn position, and rollers 127 and 127' are withdrawn from engagement with the shank of the pinion which is being hardened in the associated unit.

When a valve 218 is raised to its uppermost position by cam 187, ducts 216 and 224 communicate with one another, and associated valve 194 is forced down in its casing 193. Duct 195 is thus put on supply from line 192 while duct 196 exhausts through vent 199. With duct 195 on supply and duct 196 on exhaust, the toggle members 105, 105' are moved to expanded position to force rollers 127, 127' against the shank of the work.

The cams 182, 183, 184 and 185 (Fig. 9) of each unit actuate limit switches 232, 233, 234 and 235, respectively, through plungers 237. The functions of these switches will be described below. There is one of the plungers 237 between each cam and the associated limit switch. These plungers are reciprocal in a casting 238 that is secured to bracket 239 which in turn is fastened to the bracket 170. Each plunger engages at one end with the periphery of the cam, with which it is associated, and at its opposite end with the plunger of the limit switch with which it is associated. A coil spring 240, which surrounds each plunger, and which engages a shoulder on the plunger, serves to hold the plunger resiliently in engagement with the periphery of its associated cam.

Figure 18:
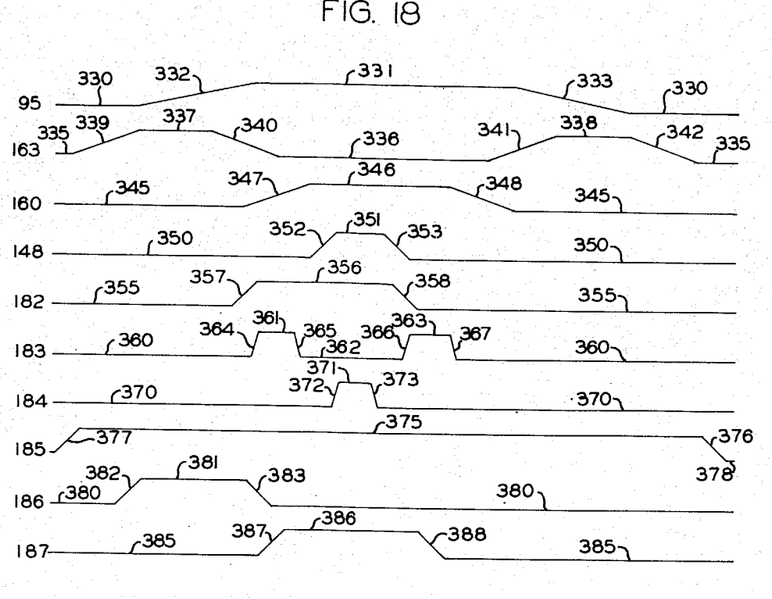
Fig. 18 is a schematic view showing a layout of the various control cams of one of the operating units of the machine.

A layout of the several control cams of the machine is shown in Fig. 18.

Cam 96, which controls the movements of the upper center 51 and arbor 60, has a track 95 with a dwell portion 330 at one radius from the axis of shaft 165, a dwell portion 331 at a smaller radius from the axis, and portions 332 and 333 connecting dwells 330 and 331.

Cam track 163, which controls the movements of transfer arm 32, has dwell portions 335 and 336 in one axial plane of shaft 165, two dwell portions 337 and 338 in a different axial plane of the shaft, and portions 339, 340, 341 and 342 connecting the dwell portions.

Cam track 160, which controls door 115, has dwell portions 345 and 346 and connecting portions 347 and 348.

Cam track 148, which controls valve 140 (Fig. 13), has dwell portions 350 and 351 and connecting portions 352 and 353.

Cam 182, which controls limit switch 232, has dwell portions 355 and 356 and connecting portions 357 and 358.

Cam 183 (see also Fig. 11), which controls limit switch 233, has dwell portions 360, 361, 362 and 363, and connecting portions 364, 365, 366 and 367.

Cam 184, which controls limit switch 234, has dwell portions 370 and 371 and connecting portions 372 and 373.

Cam 185 (see also Fig. 12), which controls limit switch 235, has a dwell portion 375, a fall 376 and a rise 377 with a very short dwell 378 between rise and fall. The button 378 (Fig. 12) serves to produce rise 377, fall 376 and brief dwell.

Cam 186, which controls the blast of air to the centers 50 and 51, has dwells 380 and 381 and connecting portions 382 and 383.

Cam 187, which controls the movements of toggle members 105 and 105' (Fig. 5) has dwells 385 and 386 and connecting portions 387 and 388.

Figure 17:
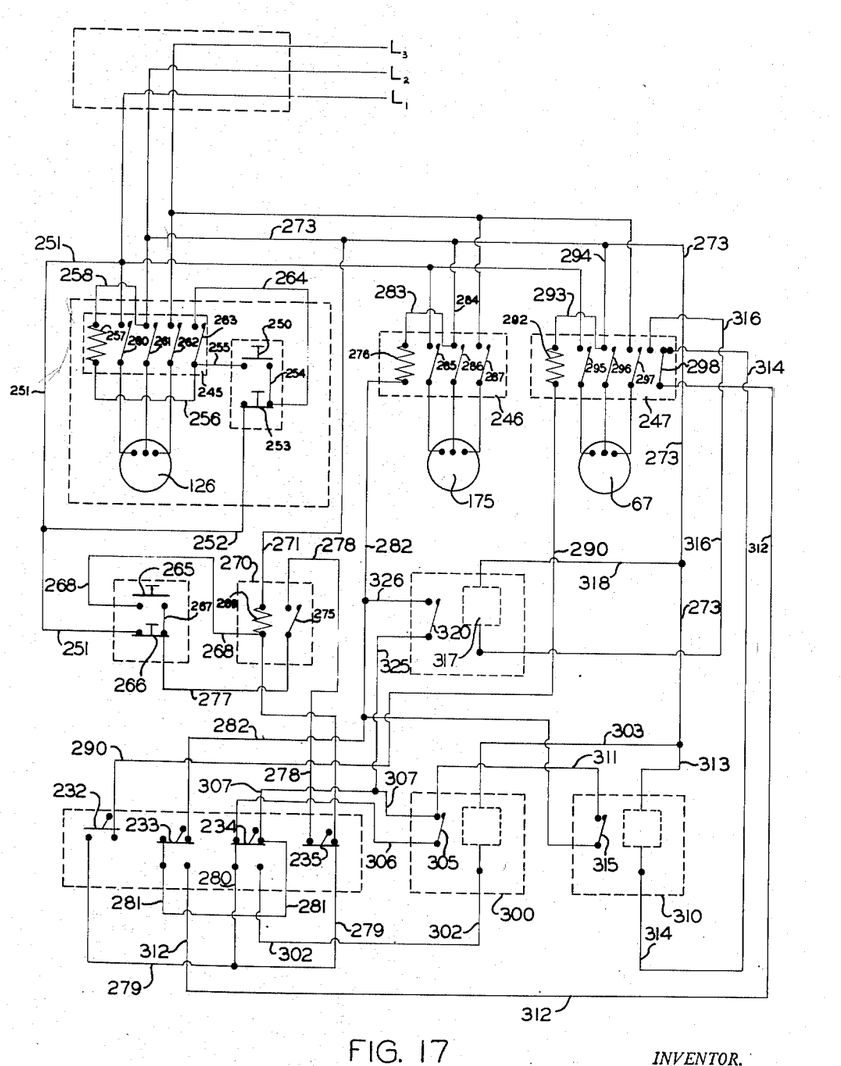
Fig. 17 is an electrical diagram showing how the machine is wired.

One way in which the machine may be wired electrically to accomplish its purpose is illustrated diagrammatically in Fig. 17. 245, 246 and 247 denote, respectively, the controllers for the motors 126, 175 and 67 which drive the pump, the cam shaft 165, and the spindle 64, respectively. These controllers may be of standard construction.

Starter button 250 and stop button 253 are manual controls for pump motor 126. When the starter button 250 is pressed in, a circuit is made from the main line $L_1$ through the line 251, line 252, the normally closed stop button 253, the line 254, the now-closed start button 250, the line 255, the line 256, the coil 257 of the controller 245, and the line 258 to the main line $L_2$. This energizes the coil 257 and closes the switch arms 260, 261, 262, and 263 of the controller, starting the pump motor 126. After this motor is started, the hold-in circuit to the coil 257 is from the main line $L_1$ through the lines 251, 252, the stop button 253, the line 264, the switch arm 263, the line 256, coil 257, and line 258 to the main line $L_2$.

Motors 175 and 67 are controlled manually by start button 265 and stop button 266. To start the motors 175 and 67, the starter button 265 must be pressed in. This makes a circuit from the main line $L_1$ through the line 251, the normally-closed stop button 266, the line 267, the now-closed start button 265, the line 268, the coil 269 of a standard relay 270, and the lines 271 and 273 to the main line $L_2$. This energizes the coil 269 causing the arm 275 of the relay to be closed.

The closing of the switch arm 275 establishes a circuit to the coil 276 of controller 246. This circuit is from the main line $L_1$ through the line 251, the normally-closed stop button 266, the line 277, the now-closed arm 275, the line 278, the normally-closed limit switch 235, the line 279, the line 280, limit switch 234, the line 281, the limit switch 233, line 282, the coil 276, line 283, and the lines 284 and 273 to the main line $L_2$. This closes the switch arms 285, 286, 287 of the controller 246 and starts the cam-drive motor 175.

The hold-in circuit to coil 276 is from main line $L_1$ through line 251, stop button 266, line 277, switch arm 275, line 278, limit switch 235, lines 279 and 280, limit switch 234, line 281, limit switch 233, line 282, coil 276, and lines 283, 284 and 273 to main line $L_2$. When limit switch 233 or limit switch 234 is shifted as will be described hereinafter, then, the circuit to coil 276 is broken and the motor 175 will be stopped.

The work spindle drive motor 67 is not started until after the work has been mounted between the centers 50 and 51. This motor is started by closing of the normally-open limit switch 232 by the cam 182. When the limit switch 232 is closed, a circuit is established from the main line $L_1$ through the line 251, the stop button 266, the line 277, the now-closed switch arm 275, the line 278, the limit switch 235, the line 279, the now-closed limit switch 232, the line 290, the coil 292 of controller 247, and the lines 293, 294 and 273 to the main line $L_2$. This closes the switch arms 295, 296, and 297 of the controller 247 and shifts the switch arm 298 of this controller, starting the motor 67.

Immediately after motor 67 is started and switch arm 298 of controller 247 is shifted, as described, the cam 183 will have rotated far enough for dwell portion 361 (Fig. 18) of this cam to shift limit switch 233. This breaks the circuit to cam drive motor 175 and stops cam shaft 165 (Fig. 9). It also causes timer 317 to be energized, a circuit being made to this timer from main line $L_1$ through line 251, stop button 266, line 277, now-closed switch arm 275, line 278, limit switch 235, lines 279 and 280, limit switch 234, line 281, now-shifted limit switch 233, line 312, now-shifted switch arm 298, line 316, timer 317, and lines 318 and 273 back to main line $L_2$.

The switch arm 320 of the timer 317 is open when this timer is started. The circuit to cam drive motor 175 remains broken, therefore, while the timer is operating. This stoppage occurs while the work is being rotated in engagement with and under pressure of rollers 127 and 127' (Fig. 5) during hot rolling of the work before the quenching liquid is turned on. When the timer 317 has completed its cycle, however, it closes the switch 320, restarting motor 175. Immediately thereafter the plunger of limit switch 233 rides down off the dwell portion 361 (Fig. 18) of cam 183 and the switch 233 shifts back to the position shown in Fig. 17.

The door 115 of the quenching chamber will now be closed. Then the valve 140 (Fig. 13) which controls flow of the quenching liquid to the quenching chamber is opened to allow the quenching chamber to be flooded with quenching liquid and the limit switch 234 is shifted by rise 372 (Fig. 18) of cam 184. This again breaks the circuit to coil 276 and stops cam drive motor 175. It also causes the timer 300 to be energized, the circuit to this timer being made from the main line L1 through the line 251, the stop button 266, line 277, now-closed switch arm 275, line 278, limit switch 235, line 279, line 280, now-shifted limit switch 234, line 302, timer 300, and lines 303 and 273 to the main line L2.

The switch arm 305 is open when the timer 300 is started. The cam drive motor 175 remains stopped, therefore, for a predetermined period, determined by the setting of the timer. Then the timer completes its function; and it closes the switch arm 305 restarting the motor. When this occurs the plunger of switch 234 rides down off the dwell 371 of cam 184; and switch 234 returns to the position shown in Fig. 17.

The cam 182 then rotates into position to allow limit switch 232 to reopen, breaking the circuit to coil 292 of controller 247, and stopping spindle drive motor 67. The valve 140 (Fig. 13) now closes, and the quenching liquid is allowed to drain out of the quenching chamber 22. Drainage occurs for a time controlled by timer 310. This timer is actuated when limit switch 233 is shifted for a second time by rise 366 (Fig. 18) of cam 183, a circuit being made to the timer from main line L1 through line 251, stop button 266, line 277, switch 275, line 278, switch 235, line 279, line 280, switch 234, which has now returned to the position shown in Fig. 17, line 281, now-shifted switch 233, line 312, switch 298, line 314, timer 310, and lines 313 and 273 to main line L2.

When the switch 233 is shifted as just described, the circuit to coil 276 is again broken; and cam drive motor 175 is again stopped. When the timer 310 is actuated, switch arm 315 is open. Cam drive motor 175 remains stopped, therefore, as long as the timer 310 is in operation. During this stoppage the quenching liquid drains out of the quenching chamber.

When timer 310 has completed its cycle, it closes switch arm 315. Cam drive motor 175 is therefore restarted. In the further rotation of cam shaft 165, then, the door 115 is opened, the transfer arm 32 is swung in to grasp the work; the upper center is moved away to release the work, and the transfer arm 32 is swung to loading position. In the last part of the movement of the transfer arm to loading position, the movable jaw of the chuck is moved to released position and cam 185 trips limit switch 235 to break the hold-in circuit to coil 269 of relay 270. This allows switch 275 to open, breaking the hold-in circuit to cam drive motor 175. The cycle of this unit of the machine is completed.

The operation of the machine will be understood from the preceding description but may be summed up here. The pump motor 126 is first started by pressing in start button 250 as already described. This insures a supply of the quenching liquid to all three units of the machine, when required. It will be understood, of course, that while the operation of only one unit of the machine will be described hereinafter, the operation of all three units is identical.

With the transfer arm 32 of any unit in loading position, the operator puts a hot pinion in the fixed jaw with surface 42 (Fig. 3) of the pinion resting on the boss 48 of the fixed jaw. He then starts cam motor 175 by pressing start button 265 (Fig. 17).

As the cam shaft 165 (Fig. 9) revolves, portion 339 (Fig. 18) of cam track 163 causes the transfer arm 32 to swing inwardly through actuation of linkage 167 (Fig. 3) and shaft 25 to which the transfer arm is secured. As roller 39 (Figs. 4 and 7) rides off cam 40, the movable jaw is actuated by spring 37 to grip the work and hold it securely during the transfer operation. When the shaft 165 has rotated through an angle of approximately 45°, the work will have been swung by the transfer arm into line with centers 50 and 51, and valve 203 (Fig. 15) will have ridden up on the high part of cam 186. Thus, the valve is opened to supply air to ducts 206 and 208 (Figs. 3 and 15); and the blasts of air emitted from the centers will blow out the centering holes 129 and 129' (Fig. 5) in opposite ends of the work.

As shaft 165 continues to rotate, portion 332 (Fig. 18) of cam track 95 (Figs. 18 and 9) will cause upper center 51 to be lowered through operation of roller 94 (Fig. 9), link 85, and screw 80 (Fig. 8) to engage the work and force it into engagement with lower center 50.

In the further rotation of cam shaft 165, the roller, which operates the linkage 167 (Fig. 3) and the transfer arm 32, rides in the portion 340 of the cam track and the transfer arm 32 is swung away from the work. The spring 37 (Fig. 4), which actuates the movable jaw 35, allows this jaw to move sufficiently to release the work as the transfer arm starts to swing away from the operating position.

In the further rotation of cam shaft 165, the plunger of limit switch 232 (Figs. 9 and 17) rides up on portion 356 (Fig. 18) of cam 182, and the circuit to spindle drive motor 67 is closed, starting this motor. The work therefore is revolved between centers 50 and 51.

Immediately thereafter, as cam shaft 165 continues to rotate, portion 347 (Fig. 18) of cam track 160 (Fig. 9) comes into operation and door 115 (Fig. 4) starts to close. Then the plunger of limit switch 233 (Figs. 9 and 17) rides up on portion 361 (Fig. 18) of cam 183 and timer 317 (Fig. 17) is actuated. The cam drive motor 175 and cam shaft 165 are stopped, therefore, for a period determined by the timer 317.

As the shaft 165 is coasting to a stop, cam 187 (Figs. 9 and 15) rotates into a position to open valve 218 (Figs. 15 and 10) and put pressure in line 195 (Figs. 15 and 5) that leads to cylinder 100. Thus the toggle members 105 and 105' are straightened out and pressure is applied through rollers 127, 127' on the hot pinion shank. The pinion continues to revolve because spindle drive motor 67 remains in operation.

The hot pinion is therefore spun in engagement with the rollers 127 and 127' under pressure. Fig. 14 illustrates diagrammatically how the application of pressure through the rollers at spaced points axially of the pinion shank straightens out the shank, for the pressure is applied at continuously changing points around the periphery of the shank due to the rotation of the shank under the rollers.

After the timer 317 has completed its cycle, the circuit to coil 276 (Fig. 17) is closed again, as has already been described, and cam drive motor 175 is restarted. Limit switch 233 is returned to normal position as its plunger rides down portion 365 (Fig. 18) of cam 183.

Figure 1:
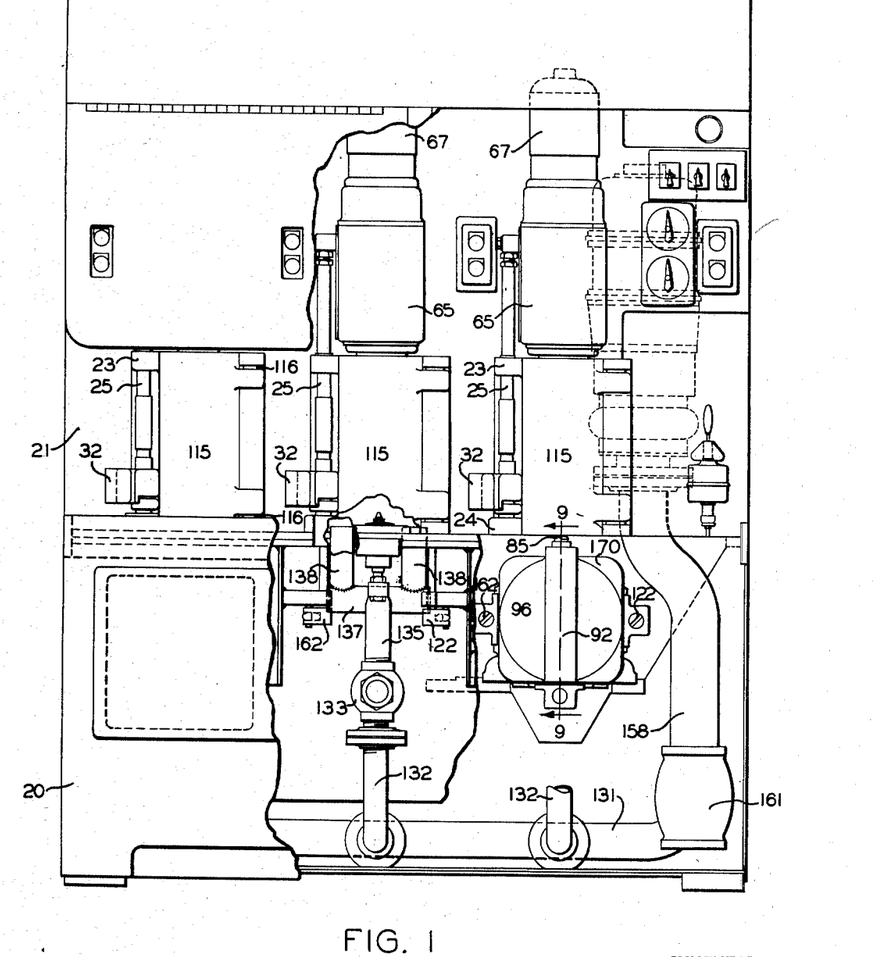
Fig. 1 is a side elevation, with parts broken away, of a pinion quenching machine built according to one embodiment of this invention.

As cam shaft 165 resumes its rotation, roller 147 (Fig. 9) causes valve 140 (Fig. 13) to open, and the closed quenching chamber is flooded with the quenching liquid through ducts 138 (Figs. 1, 4 and 16). Immediately thereafter the plunger of limit switch 234 (Fig. 9) rides up on portion 371 (Fig. 18) of cam 184 and timer 300 (Fig. 17) is actuated. Cam motor 175 is stopped again as already described.

As the work is being quenched it continues to spin through operation of driving arbor 60 (Fig. 8) and its shank continues to be under pressure of the rollers 127 and 127'. As the work cools under action of the quenching liquid it shrinks. Springs 88 and 72 insure however that arbor 60 and center 51 follow the work downwardly in its shrinkage, maintaining driving engagement of the centers with the work despite its shrinkage in length. The hydraulic pressure in cylinder 100 (Fig. 5) insures that the rollers 127 and 127' continue to press laterally against the work as it shrinks. Stop plate 153 (Fig. 4) limits the movement of ram 111, however, so that no pressure will be exerted on the shank after it reaches its normal cold diameter.

When timer 300 (Fig. 17) has completed its cycle, cam drive motor 175 is restarted. The plunger of cam 234 then rides down portion 373 of cam 184.

In the further rotation of cam shaft 165, the plunger of limit switch 232 (Fig. 9) rides down off the portion 356 (Fig. 18) of cam 182. This permits limit switch 232 to open, stopping spindle motor 67 as already described. This stops the rotation of the work.

Substantially simultaneously the roller 147 (Fig. 9), which operates the mechanism that controls valve 140 (Fig. 13), rides into the portion 353 (Fig. 18) of cam track 148, causing that valve to be shifted to allow drain of the quenching liquid from chamber 22 through ducts 138, 137 and 139 to the sump (Figs. 1 and 16). As drainage begins, the plunger of limit switch 233 (Fig. 9), which has been riding in the dwell portion 362 (Fig. 18) of cam 183, rides up on rise portion 366 of this cam. This shifts switch 233 again, causing cam drive motor 175 to be stopped once more, and actuates timer 310 (Fig. 17) as already described.

As the cam shaft 165 coasts to a stop, the arm 220 (Fig. 10) rides down off the land 386 of cam 187, and line 195 (Fig. 15) to cylinder 100 (Fig. 5) is put on exhaust, while line 196 is put on supply. This moves the toggle members 105 and 105' to released position and the rollers 127 and 127' are withdrawn from engagement with the work.

The motor 175 remains stopped for a period long enough to permit all of the quenching liquid to drain out of chamber 22, as determined by the setting of timer 310. Then cam drive motor 175 is restarted. In the further rotation of cam shaft 165, the roller, which engages in cam track 160 (Fig. 9), rides into the portion 348 (Fig. 18) of that track causing the door 115 to open. As the door is opening the roller, which engages in cam track 163 (Fig. 9), rides into the portion 341 (Fig. 18) of that track, and the transfer arm is swung once more from loading position to operating position where the jaws 33 and 36 (Fig. 4) grasp the shank of the now-hardened pinion.

The roller 94 (Fig. 9) now rides into the portion 333 (Fig. 18) of cam track 95; and arbor 60 and upper center 51 are disengaged from the work. The roller in cam track 163 then rides into portion 342 of that cam track and the transfer arm 32 is swung back to loading position carrying with it the now-hardened, cool work piece. In the last part of this movement, roller 39 (Figs. 4 and 7) rides up on cam 40; and movable jaw 35 is moved to released position against spring 37. Thus the work piece is released so that it may readily be lifted out of the transfer arm; and the movable jaw is held open so that a new pinion may readily be placed on the arm.

Just after the transfer arm reaches loading position the plunger of limit switch 235 (Fig. 9) rides onto the button 378 (Figs. 12 and 18) of cam 185. This trips the limit switch, stopping cam motor 175. The cycle of operation of the unit has been completed. For a new cycle start button 265 (Fig. 17) must be pressed in again.

It will be seen, then, that after a unit is started, the transfer arm swings the hot work piece from loading position to operating position in the quenching chamber. When the work reaches loading position compressed air is blown through centers 50 and 51 to blow out the center recesses of the work. Then the arbor 60 and upper center 51 are lowered to grip the work. Then the transfer member 32 is swung away from the work leaving it held between the centers. Then the spindle motor is started to spin the work; the door of the quenching chamber closes; pressure is applied to the shank of the work at axially and angularly spaced points through rollers 127 and 127', and the hot work piece is rolled for a period under pressure of the rollers while relatively plastic, the time of hot-rolling being determined by the setting of the timer which controls the period of such rolling. Then the quenching liquid is turned on to flood the quenching chamber; and the work is rotated under pressure of rollers 127 and 127' in the bath of oil or other quenching liquid, that fills the quenching chamber, for a period determined by the setting of the timer that controls the quenching operation. Then the rotation of the work is stopped; the quenching chamber is drained of the quenching liquid; the pressure on the pinion shank is relieved; the door is opened; the transfer arm is swung back to engage the work; and the upper center is withdrawn from engagement with the work to leave the work held by the transfer arm. Then the transfer arm is swung back to loading position; and the movable gripping jaw of the arm is moved to released position to permit removal of the completed work piece and placement of a new work piece.

While the invention has been described particularly in connection with the quenching and hardening of shank pinions, it is not restricted to such use. The process and machine of this invention may be used for quenching shafts, and other elongated, rotary parts which it is required to keep straight or to straighten during quenching and hardening. Furthermore, while the invention has been described in connection with a specific embodiment thereof, it is capable of further modification. This application is intended to cover any variations, uses or adaptations of the invention following, in general, the principles of the invention, and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. A quenching press for shank-pinions and the like comprising a quenching chamber, a pair of coaxial, rotatable centers adapted to support the work, a movable loader member, means for moving the loading member to move a workpiece from loading position outside said chamber to operative position with the axis of the workpiece aligned with the axis of said centers, and vice-versa, said loading member having a pair of jaws between which the workpiece may be held, one of said jaws being spring-pressed, means for moving the centers relatively toward and from one another to grip and release a workpiece, respectively, means for rotating the centers, and means for supplying a quenching medium to the quenching chamber, and means for controlling the sequence of operation of the various parts so that the workpiece is moved by the loading member to operative position, then the centers are moved relatively toward one another to grip the workpiece, then the loading member is moved away from operative position and the means for rotating the work support is actuated, and then the quenching medium is supplied to the quenching chamber.

2. A quenching press comprising a quenching chamber, a support mounted in said chamber adapted to support a workpiece during a quenching operation, a loader member movable to transfer a workpiece from loading position outside the chamber to the work support and vice versa, a door for closing the chamber to enclose the workpiece within the chamber during the quenching operation, means for supplying a quenching medium to the chamber, and means for controlling the sequence of operation of the several parts so that after the workpiece has been transferred from the loader member to the work support, the loader member is moved back to loading position, the door is closed, and the quenching medium is supplied to the chamber.

3. A quenching press for shank-pinions and like parts, which have center-receiving recesses in their opposite ends, comprising a quenching chamber, a pair of coaxial centers for rotatably supporting a workpiece, a loader member movable to transfer a workpiece from loading position outside said quenching chamber to operative position in which it is coaxial with the centers, means for actuating the loader member, means for moving the centers relatively toward one another to engage the workpiece between them when the workpiece is in operative position, means operable to direct a blast of air at the center-receiving recesses of the workpiece before the centers engage the workpiece, means for rotating the centers to rotate the workpiece, and means for supplying a quenching medium to the chamber.

4. A quenching press for shank-pinions and the like, comprising a quenching chamber, a pair of coaxial centers mounted within said chamber for supporting the work, a loader member for transferring a workpiece from outside said chamber to operative position coaxial with the centers and vice versa, means for constantly urging the centers toward one another, means for moving the centers relatively toward and from one another to engage and disengage the work, respectively, a pressure-applying member, means for urging said pressure applying member in a direction at right angles to the axis of the centers to apply pressure to the work and for moving the pressure applying member in the opposite direction to disengage it from the work, means for rotating the centers, means for supplying a quenching liquid to the chamber, and means operatively connected to the aforementioned several parts controlling the operation of said several parts so that the workpiece is first moved by the loader member from loading to operative position, the centers are then engaged with the workpiece, the means for rotating the centers is actuated, the pressure-applying member is moved to operative position, and the quenching liquid is supplied to the quenching chamber, and then after a predetermined period, the quenching liquid is drained from the chamber, the rotation of the centers is stopped, the centers are disengaged from the work and the work is moved by the loader member to loading position.

5. A quenching press for shank-pinions and like parts, which have center-receiving recesses in their opposite ends, comprising a quenching chamber, a pair of coaxial centers for rotatably supporting a workpiece, each of said centers having a centrally-disposed duct therein for directing a blast of air at the center-receiving recesses of the workpiece, means for moving the centers relatively toward one another to engage the workpiece between them, means for rotating the centers to rotate the workpiece, means for supplying compressed air to said ducts and means for supplying a quenching medium to said chamber.

6. A quenching press for shank-pinions and like parts, which have center-receiving recesses in their opposite ends, comprising a quenching chamber, a pair of coaxial centers for rotatably supporting a workpiece, each of said centers having a centrally-disposed duct therein for directing a blast of air at the center-receiving recesses of the workpiece, means for moving the centers relatively toward one another to engage the workpiece between them, means for rotating the centers to rotate the workpiece, means for supplying compressed air to said ducts, means for supplying a quenching medium to said chamber, and means for controlling the operation of said several means so that blasts of air are first directed at said center-receiving recesses, then said center moving means is actuated to move the centers relatively toward one another to engage the workpiece, then said centers are rotated to rotate the workpiece, and then the quenching medium is supplied to said chamber.

7. A quenching press for shank-pinions and like parts, which have center-receiving recesses in their opposite ends, comprising a quenching chamber, a pair of coaxial centers for rotatably supporting a workpiece, each of said centers having a centrally-disposed duct therein for directing a blast of air at the center-receiving recesses of the workpiece, means for moving the centers relatively toward one another to engage the workpiece between them, means for rotating the centers to rotate the workpiece, means for supplying compressed air to said ducts, means for supplying a quenching medium to said chamber, means for applying pressure to the workpiece at right angles to its axis as it rotates, and means operatively connected to the several means for controlling the operation of the several means so that blasts of air are first directed at said center-receiving recesses, then said center-moving means is actuated to move the centers toward one another to engage the workpiece, then said centers are rotated to rotate the workpiece, then said pressure-applying means is actuated to engage and press on the work, and then the quenching medium is supplied to said chamber.

8. A quenching press for shank-pinions and like parts, which have center-receiving recesses in their opposite ends, comprising a quenching chamber, a pair of coaxial centers for rotatably supporting a workpiece, each of said centers having a centrally-disposed duct therein for directing a blast of air at the center-receiving recesses of the workpiece, means for moving the centers relatively toward one another to engage the workpiece between them, means for rotating the centers to rotate the workpiece, means for supplying compressed air to said ducts, means for supplying a quenching medium to said chamber, means for transferring a workpiece from a loading position outside said quenching chamber to an operative position in which it is coaxial with said centers, and means for controlling the sequence of operation of the several parts so that after a workpiece has been transferred from loading position to operative position, blasts of air are directed at said center-receiving recesses, then said center-moving means is actuated to move the centers toward one another to engage the workpiece, then said centers are rotated to rotate the workpiece, and then the quenching medium is supplied to said chamber.

9. A quenching press comprising a quenching chamber having an opening at one side thereof, a swingable transfer arm pivoted along one boundary of said opening, a closure for said opening hingedly mounted at the opposite boundary of said opening, means on said transfer arm for supporting a workpiece, a work support rotatable in said quenching chamber, means for actuating said transfer arm to swing it from a loading position outside said chamber to a position inside said chamber in which the workpiece is coaxial with said work support and for swinging said arm back to loading position, means for securing the workpiece to said work support in coaxial relationship, means for closing said closure after the workpiece has been secured to said work support and said transfer arm has been swung back to loading position, and means for supplying a quenching medium to the closed chamber.

10. A quenching press comprising a quenching chamber having an opening at one side thereof, a work support rotatable in said quenching chamber, a swingable transfer member pivoted along one boundary of said opening and movable to transfer a workpiece from loading position outside said chamber to a position inside said chamber in which the workpiece is coaxial with said work support, a closure for said opening hingedly mounted at the opposite boundary of said opening from said transfer member, said transfer member comprising a fixed jaw and a movable jaw, a spring for urging the movable jaw to work-gripping position, a cam fixedly secured to said chamber adjacent the first-named boundary of said opening, a follower secured to said movable jaw in position to engage said cam when said transfer member is moved to loading position to open said movable jaw in such position, means for securing the workpiece to said work support in coaxial relationship, means for closing said closure after the workpiece has been secured to the work support, and means for supplying a quenching medium to the closed chamber.

11. A quenching press comprising a quenching chamber having an opening at one side thereof, a work support rotatable in said quenching chamber, a swingable transfer arm pivoted along one boundary of said opening to transfer a workpiece from loading position outside said chamber to the work support and vice versa, a closure for said opening hingedly mounted at the opposite boundary of said opening, means for rotating the work support, means for supplying a quenching medium to the chamber, means for applying pressure to said workpiece in a direction at right angles to the axis of rotation of said work support, and means for controlling the sequence of operation of the several parts so that after the workpiece has been transferred from the transfer arm to the work support, the transfer arm is moved back to loading position, the closure is closed, the work is rotated, pressure is applied to the workpiece, and the quenching medium is supplied to the chamber.

12. A quenching press comprising a quenching chamber having an opening at one side thereof, a work support rotatable in said quenching chamber, a swingable transfer arm pivoted along one boundary of said opening to transfer a workpiece from loading position outside said chamber to the work support and vice versa, a closure for said opening hingedly mounted at the opposite boundary of said opening, means for rotating the work support, means for supplying and evacuating a quenching medium to and from the chamber, means for applying pressure to said workpiece in an axis at right angles to the direction of rotation of said work support, and means for controlling the sequence of operation of the several parts so that after the workpiece has been transferred from the transfer arm to the work support, the transfer arm is moved back to loading position, the closure is closed, the work support is rotated, pressure is applied to the workpiece, and the quenching medium is supplied to the chamber, and after a predetermined time, the rotation of the work is stopped, the quenching chamber is evacuated, the pressure on the workpiece is released, the transfer arm is swung into the chamber to engage the workpiece and is then swung out again to carry the workpiece to loading position.

13. The method of quenching an elongated rotatable part having coaxial centering formations at its ends, which comprises mounting the part, while hot and relatively plastic, between supporting centers engaged with said formations, rotating it on the axis of said centers, and, while it is so rotating, bowing its axis by exerting a pressure against it in a direction at right angles to said axis at a plurality of axially spaced points intermediate its ends, all of which points are disposed to one and the same side of a plane containing said axis.

14. The method of quenching an elongated rotatable part having coaxial centering formations at its ends, which comprises mounting the part, while hot and relatively plastic, between supporting centers engaged with said formations, rotating it on the axis of said centers, and, while it is so rotating, bowing its axis by exerting a pressure against it in a direction at right angles to said axis at a plurality of points intermediate its ends, said points being spaced from each other both angularly and axially of the part but all being disposed to one and the same side of a plane containing said axis.

15. The method of quenching a shank pinion having coaxial centering formations at its ends, which comprises mounting the part, while hot and relatively plastic, between supporting centers engaged with said formations, rotating it on the axis of said centers and, while it is so rotating, bowing it by moving a pressure member against its shank at a point between said centers, said member being moved toward said axis to a predetermined distance therefrom to thereby effect a controlled bowing of the hot pinion, and then liquid quenching it while continuing to rotate it and maintaining said member at said predetermined distance from said axis.

16. The method of quenching a shank pinion having coaxial centering formations at its ends, which comprises mounting the pinion, while hot and relatively plastic, between coaxial supporting centers engaged with said formations, rotating the pinion on the axis of said centers and, while it is so rotating, bowing it by moving a pressure device against its shank at two axially spaced points between said centers, said member being moved toward said axis to a predetermined distance therefrom to thereby effect a controlled bowing of the hot pinion, and quenching the pinion while continuing to rotate it and maintaining said pressure device at said predetermined distance from said axis until said shank reaches a desired cold diameter.

17. A quenching press comprising a quenching chamber, a pair of coaxial work supporting centers in the chamber and adapted to engage the opposite ends of the work, means for securing the work between the supporting centers in coaxial relation therewith, at least one of the centers being rotatable, means for rotating said one of the centers to thereby rotate the work about its axis, a pair of pressure-applying members both of which are disposed to one and the same side of a plane containing the axis of the work supporting centers and which are movably mounted in the chamber to engage two axially spaced sections of the work that are intermediate said opposite ends thereof, and means to move said pressure-applying members toward the axis of the centers to a limit position wherein they engage and bow the heated work supported by the centers.

18. A quenching press comprising a quenching chamber, a pair of coaxial work supporting centers in the chambers and adapted to engage opposite ends of the work, means for securing the work between the centers in coaxial relation therewith, at least one of the centers being rotatable, means for rotating said one of the centers to thereby rotate the work about its axis, a member reciprocable in the chamber in a direction at right angles to the axis of the centers, a pair of rollers carried by said member to rotate on spaced axes parallel to the axis of the centers and having their peripheral surfaces shaped to simultaneously engage angularly spaced portions of the same section of the shank of the work disposed intermediate said opposite ends thereof, and fluid pressure operated means for urging the member toward the axis of the centers to a limit position wherein the rollers engage and bow the heated work supported by the centers.

19. A quenching press for shank pinions and the like, comprising a quenching chamber, a pair of coaxial work supporting centers in the chamber and adapted to engage the opposite ends of the work, at least one of the centers being rotatably mounted in the chamber, a member movable in the chamber to engage the shank of the work to apply pressure against the shank in a direction at right angles to the axis of the work, means for rotating said one of the centers, means for moving said member to and from engagement with the work, means for supplying a quenching medium to said chamber, a plurality of rotatable, coaxial control cams for controlling, respectively, the rotation of said one of the centers, the pressure-applying member, and the supply of the quenching medium, a shaft to which all of said cams are secured, and means for rotating said shaft.

20. A quenching press for shank pinions and like work, comprising a quenching chamber having an opening at one side thereof, a pair of coaxial work supporting centers in said chamber adapted to engage opposite end portions of the work, a swingable transfer arm pivoted along one boundary of the chamber opening and adapted to carry the work through the opening between a loading station outside of the chamber and a quenching station in the chamber and in which the work is coaxial with said supporting centers, said centers being relatively movable axially to engage the work when the latter is in said quenching station, and a closure hinged to the opposite boundary of the chamber opening to close the latter when the transfer member has been swung out of the chamber.

21. A quenching press comprising a quenching chamber, spaced centers mounted in said chamber between which the work is adapted to be supported for rotation, the centers being tapered to engage in complementarily tapered recesses in the ends of the work, means for moving the centers relatively toward one another as the work cools to maintain driving engagement of the centers with the work and to maintain the work coaxial with the centers, a pressure-applying member movable toward and away from the axis of the centers respectively to and from a limit position wherein it engages and bows the heated work between the centers, and means for moving said member to said limit position.

22. A quenching press comprising a quenching chamber, a pair of coaxial workpiece-supporting centers in the chamber adapted to engage centering formations on the opposite ends of the workpiece, means for effecting relative axial movement of the centers to so engage the workpiece, means for effecting rotation of the workpiece while it is so engaged, and means for bowing the rotating workpiece between said centers, at least when the workpiece is hot, said bowing means comprising a member engageable with the workpiece at a point intermediate of the ends thereof and means for moving said member toward the axis of the centers, said bowing means including means to limit the movement of said member toward said axis to thereby control the amount of such bowing.

23. The method of quenching a generally cylindrical part, such as a shank pinion, having coaxial centering formations at its ends, which comprises mounting the part, while hot and relatively plastic, between coaxial supporting centers engaged with said formations, rotating the part on its axis as determined by said centers, bowing the rotating part by moving at least one roller against it at a point intermediate its ends, the roller being moved toward the axis of the centers to a predetermined distance therefrom such that it remains in rolling contact with the part when the latter has contracted to a desired cold diameter, and quenching the part while continuing to rotate it and while maintaining said roller at said predetermined distance from the axis of the centers at least until the part reaches said desired cold diameter.

References Cited in the file of this patent

UNITED STATES PATENTS

| Number | Name | Date |
|---|---|---|
| 230,638 | King | Aug. 3, 1880 |
| 1,153,255 | Redmon | Sept. 14, 1915 |
| 1,335,912 | Olson | Apr. 6, 1920 |
| 1,369,904 | Patterson | Mar. 1, 1921 |
| 1,500,571 | Brandenburg | July 8, 1924 |
| 1,626,022 | Corbett | Apr. 26, 1927 |
| 1,626,410 | Halstead | Apr. 26, 1927 |
| 1,645,869 | Murdoch | Oct. 18, 1927 |
| 1,661,221 | Hall | Mar. 6, 1928 |
| 1,851,397 | Matthews | Mar. 29, 1932 |
| 1,948,480 | Schicht | Feb. 20, 1934 |
| 1,958,846 | Christensen | May 15, 1934 |
| 2,049,830 | Bayless | Aug. 4, 1936 |
| 2,120,843 | Shoemaker | June 14, 1938 |
| 2,188,257 | Urschel | Jan. 23, 1940 |
| 2,215,724 | Judge | Sept. 24, 1940 |
| 2,231,087 | Protin | Feb. 11, 1941 |
| 2,258,562 | Arey et al. | Oct. 7, 1941 |
| 2,333,344 | Smith et al. | Nov. 2, 1943 |
| 2,354,656 | Annesley | Aug. 1, 1944 |
| 2,467,665 | Gogan | Apr. 19, 1949 |
| 2,483,477 | Shorter | Oct. 4, 1949 |

FOREIGN PATENTS

| Number | Country | Date |
|---|---|---|
| 351,873 | Great Britain | July 2, 1931 |